United States Patent [19]

Fabbri Corsarini

[11] Patent Number: 5,460,310
[45] Date of Patent: Oct. 24, 1995

[54] MAGNETICALLY-COUPLING SKI RACK WITH ANTI-THEFT MEANS, FOR MOTOR VEHICLES IN GENERAL

[75] Inventor: Luciano Fabbri Corsarini, Lonato, Italy

[73] Assignee: I.L.M.A. S.r.l. Industria Lavorazioni Meccaniche Autoaccessori, Bornato Cazzago S. Martino, Italy

[21] Appl. No.: 14,486

[22] Filed: Feb. 8, 1993

[30] Foreign Application Priority Data

Feb. 24, 1992 [IT] Italy .................... MI92A0403

[51] Int. Cl.⁶ ......................................... B60R 9/00
[52] U.S. Cl. ............................. 224/315; 224/917
[58] Field of Search .................... 224/917, 315, 224/322, 325

[56] References Cited

U.S. PATENT DOCUMENTS

| | | | |
|---|---|---|---|
| 3,907,184 | 9/1975 | Zane et al. | 224/315 |
| 4,173,965 | 11/1979 | Vallee et al. | 224/315 |
| 4,728,019 | 3/1988 | Olliges | 224/315 |

FOREIGN PATENT DOCUMENTS

| | | |
|---|---|---|
| 1466472 | 12/1966 | France . |
| 2423565 | 11/1975 | Germany . |
| 2185948 | 8/1987 | United Kingdom . |

OTHER PUBLICATIONS

Revue Automobile No. 51, Dec. 17, 1992, Berne CH, p. 13 "porte-skis magnetique a antivol".
Patent Abstract of Japan vol. 12-No. 149 (M-694) (2996) May 10, 1988 & JP-62 268751 (Nichirei...) Nov. 21, 1987.

*Primary Examiner*—Renee S. Luebke
*Attorney, Agent, or Firm*—Guido Modiano; Albert Josif

[57] ABSTRACT

The magnetically coupling ski rack has a panel made of magnetic material which is associable with a motor vehicle roof, and removable therefrom by lifting one edge of the magnetic panel and then gradually removing the entire magnetic panel. Ski-supporting brackets are connected to the magnetic panel. The magnetic panel is covered by a covering element. A locking mechanism is provided for preventing removal of skis from the ski supporting brackets. The locking mechanism also prevents removal of the covering element in order to gain access to the magnetic panel, which in turn prevents removal of the magnetic panel from a vehicle roof.

14 Claims, 4 Drawing Sheets

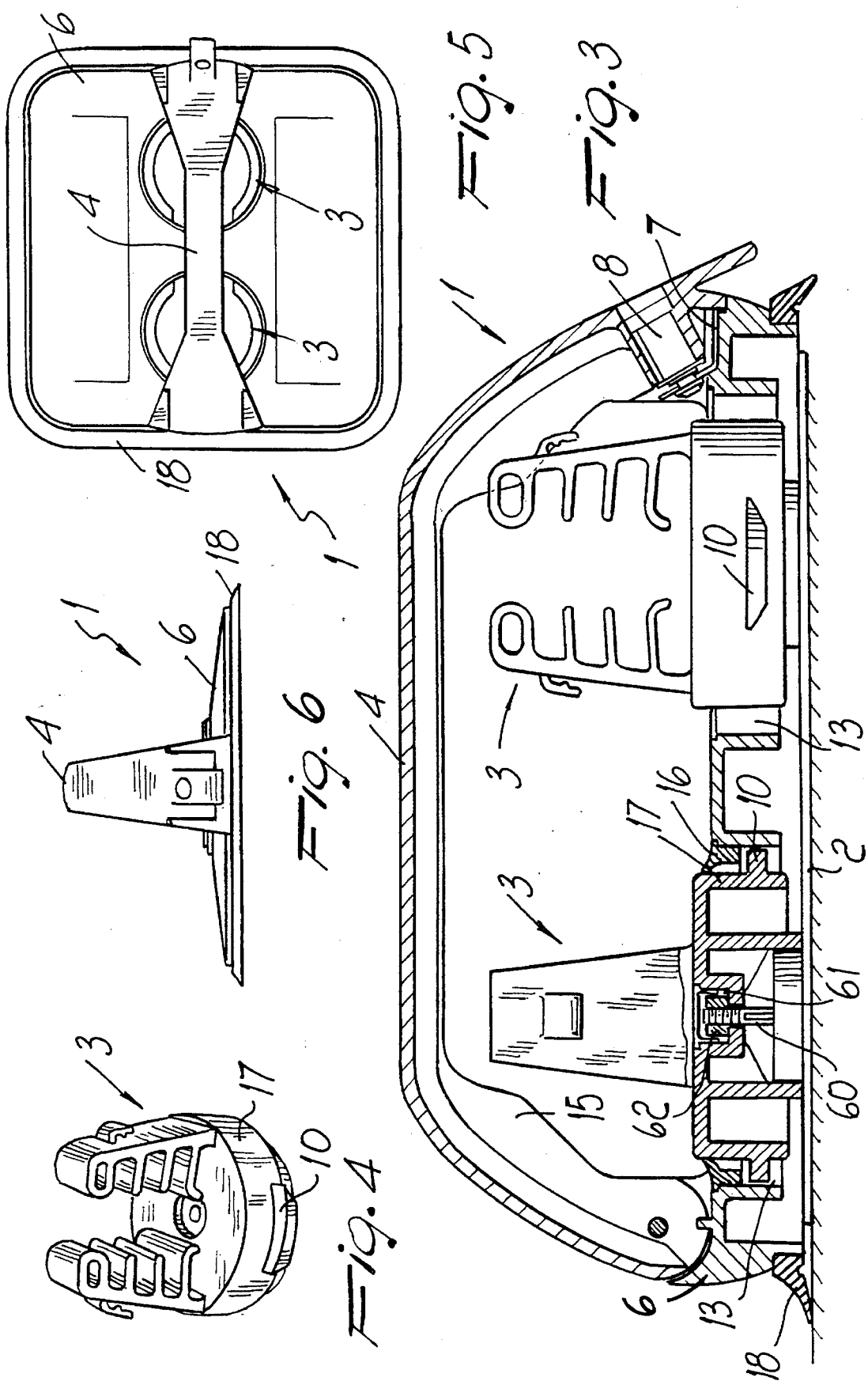

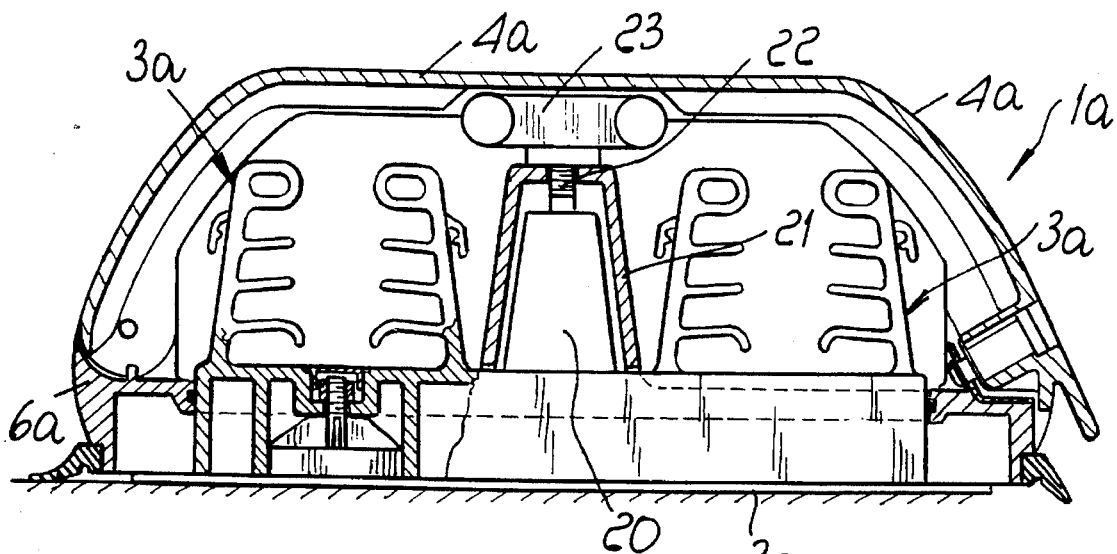
Fig. 7
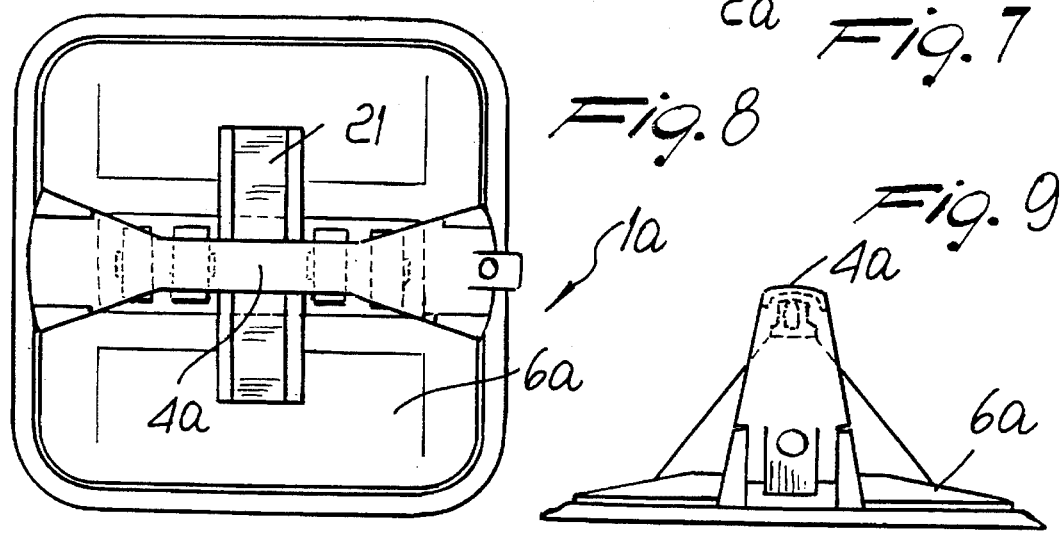
Fig. 8
Fig. 9
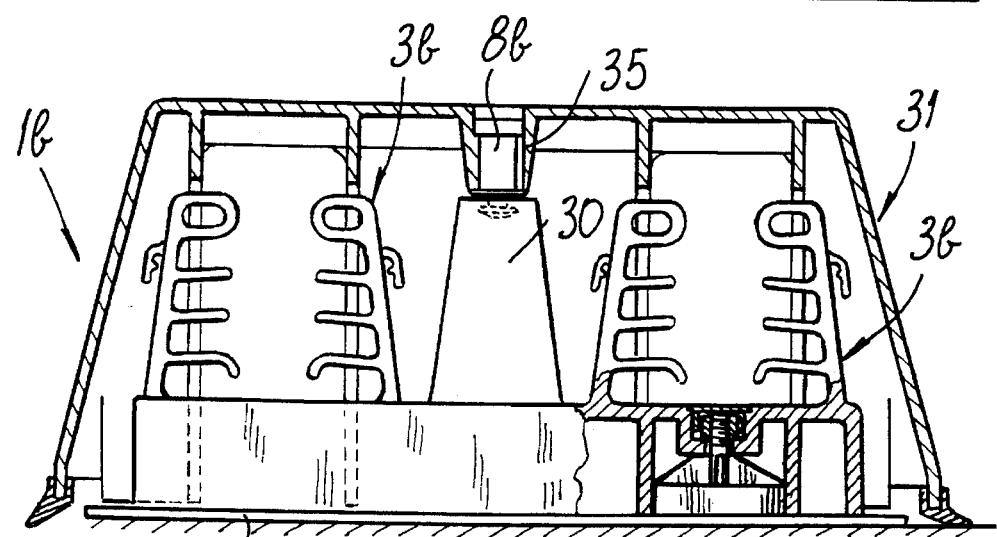
Fig. 10

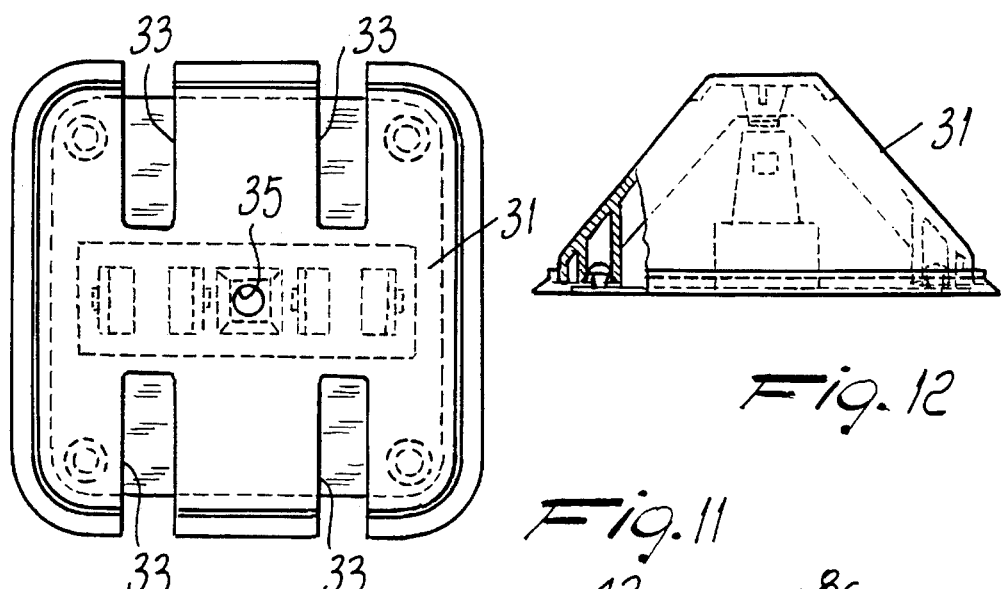
Fig. 11
Fig. 12
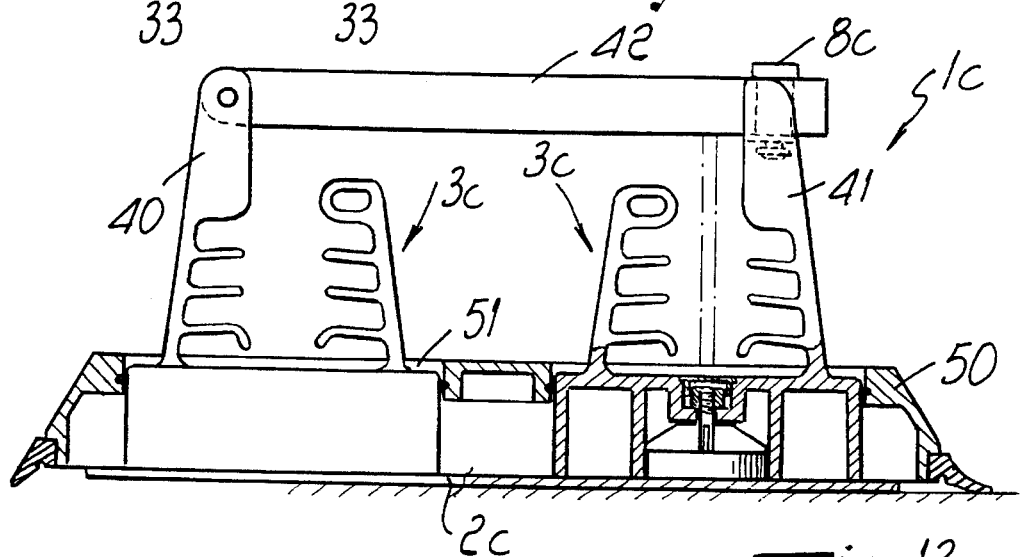
Fig. 13
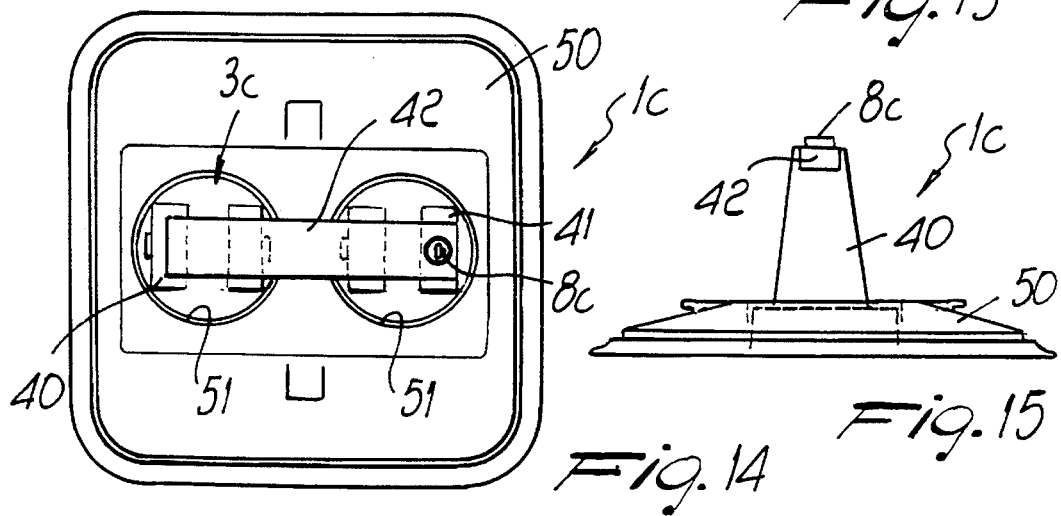
Fig. 14
Fig. 15

5,460,310

MAGNETICALLY-COUPLING SKI RACK WITH ANTI-THEFT MEANS, FOR MOTOR VEHICLES IN GENERAL

BACKGROUND OF THE INVENTION

The present invention relates to a magnetically-coupling ski rack with anti-theft means, for motor vehicles.

As is known, ski racks have already been produced which can be coupled to the roof of a motor vehicle by magnetic-coupling means having a plate-like element made of magnetic rubber or the like which adheres to the motor vehicle and supports conventional ski application brackets.

Ski racks of this type, such as for example the one disclosed in German patent application DE-2423565, have proved to be satisfactory from a strictly functional point of view, since the magnetic base plate is capable of exerting a coupling force which is more than sufficient to retain the skis on the roof of the motor vehicle even during high-speed travel of the vehicle.

However when using these types of ski racks, it is not possible to apply anti-theft devices in order to prevent unlawful removal of the skis.

As is known, in conventional ski racks the skis are in fact retained by means of a bar or the like which surmounts the skis and is closed, at the couplings of the ski rack to the roof, a lock which prevents removal of the skis from the ski rack.

This type of solution cannot be applied to magnetically-coupling ski racks, since even if the skis are locked with respect to the ski rack it is possible to very easily remove the ski rack from the roof of the vehicle, simply by lifting the magnetic plate at one edge and gradually separating it from the roof of the motor vehicle.

In this case, therefore, even if the separation of the skis from the ski rack can be prevented, one could not prevent the unlawful removal of the skis, together with the associated ski racks.

SUMMARY OF THE INVENTION

The aim of the present invention is indeed to solve the problems described above by providing a magnetically-coupling ski rack provided with an anti-theft mechanism, which to prevent not only the separation of the skis but also the separation of the ski rack from the motor vehicle.

Within the scope of the above aim, a particular object of the invention is to provide a magnetically-coupling ski rack which prevents the infiltration of water or liquids below the magnetic plate, consequently eliminating the possibility of accidental separation of the plate from a vehicle roof.

Another object of the present invention is to provide a magnetically coupling ski rack which is reliable and safe in use motor vehicles in general, which by virtue of its peculiar constructive characteristics is capable of giving the greatest assurances of reliability and safety in use.

With the above aim and objects in view, the invention provides a magnetically coupling ski rack as defined in the following description and claims.

BRIEF DESCRIPTION OF THE DRAWINGS

Further characteristics and advantages will become apparent from the description of some preferred but not exclusive embodiments of a magnetically-coupling ski rack with anti-theft means, for motor vehicles in general, illustrated only by way of non-limitative example in the accompanying drawings, wherein:

FIG. 3 is a sectional view of the ski rack;

FIG. 4 is a schematic perspective view of a ski supporting bracket;

FIG. 5 is a top plan view of the ski rack in closed position;

FIG. 6 is a lateral elevation view of the ski rack;

FIG. 7 is a transverse sectional view of a second embodiment of the ski rack;

FIG. 8 is a top plan view of the ski rack of FIG. 7;

FIG. 9 is a lateral elevation view of the ski rack of FIG. 7;

FIG. 10 is a transverse sectional view of a third embodiment of the ski rack;

FIG. 11 is a top plan view of the ski rack of FIG. 10;

FIG. 12 is a partially cutout lateral elevation view of the ski rack of FIG. 10;

FIG. 13 is a partially sectional view of a third embodiment of the ski rack;

FIG. 14 is a top plan view of the ski rack of FIG. 13;

FIG. 15 is a lateral elevation view of the ski rack of FIG. 13.

DESCRIPTION OF THE PREFERRED EMBODIMENTS

Figure 1:
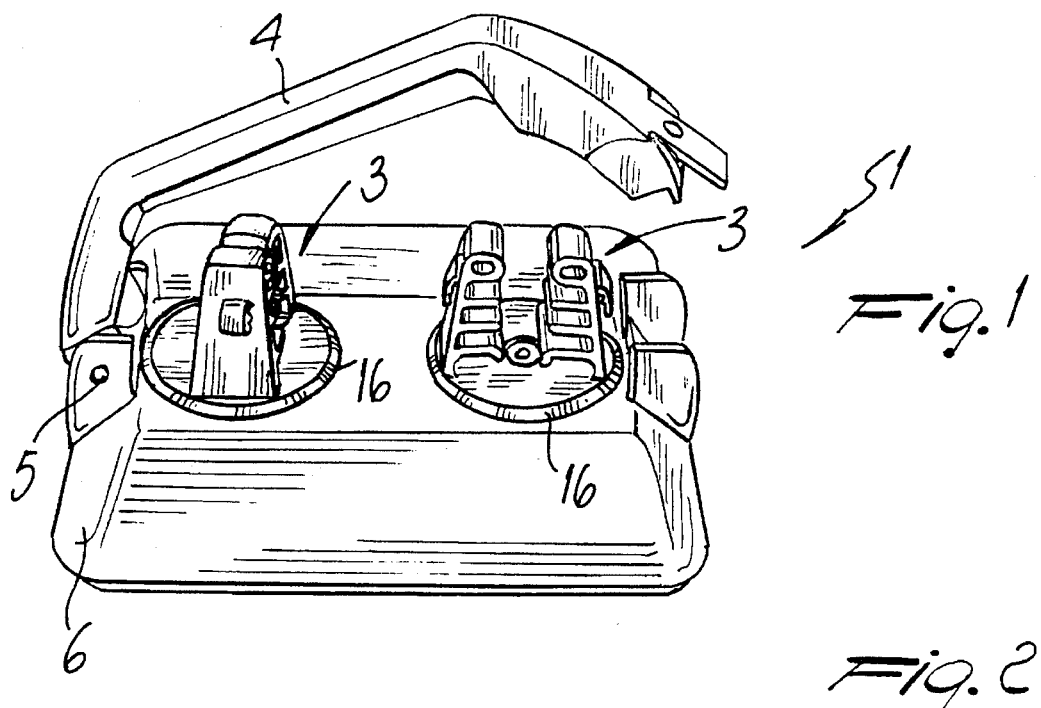
FIG. 1 is a schematic perspective view of a first embodiment of the ski rack in open position.
Figure 2:
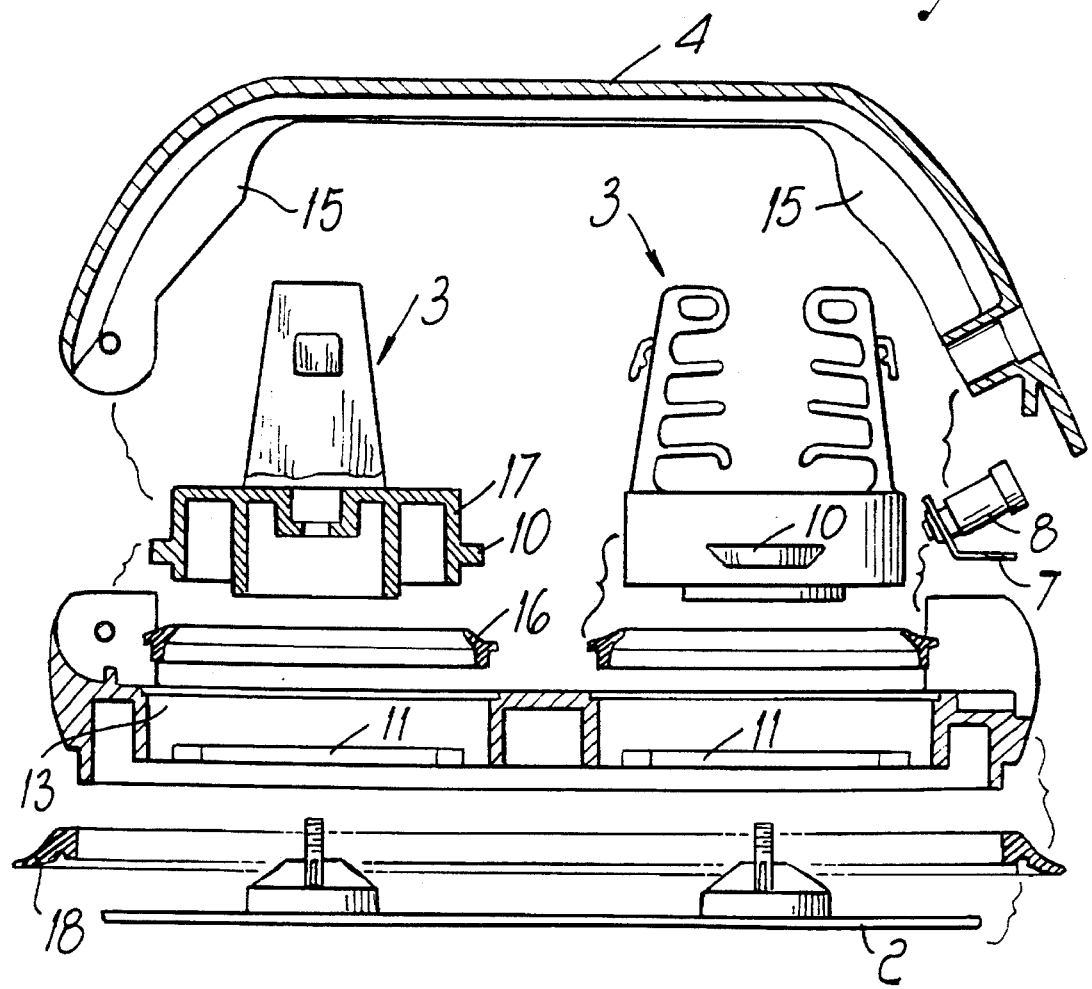
FIG. 2 is a partially sectional exploded view of the ski rack of FIG. 1.

With reference to the above figures, and particularly to FIGS. 1 to 6, the magnetically-coupling ski rack with anti-theft means, for motor vehicles in general, according to the present invention, generally designated by the reference numeral 1, comprises a panel 2 made of magnetic material which is constituted for example by magnetic rubber or the like and can be applied by magnetic adhesion to a metallic roof of a motor vehicle.

One or more ski supporting brackets, generally designated by the reference numeral 3, are connected to the panel 2; there are two brackets in the specific example, but these can be provided in any number.

The brackets 3 are rotatably supported by the magnetic panel 2 and are surmounted by a transverse bar 4 which is pivoted at 5 at one of its ends to a covering element 6 whose function will become apparent hereinafter. At its other end, the transverse bar 4 has a closure hook 7 which is controlled by lock-operated means 8 which are supported at the end of the bar 4 so that, when the lock 8 is in closed position, the bar cannot be opened.

The important peculiarity of the invention is constituted by the fact that the covering element 6 is structured so that it completely covers the panel 2, so as to not allow access to the plate 2 to separate it from the vehicle.

In the embodiment illustrated in FIGS. 1 to 6, the covering element 6 is connected to the panel 2 by using the supporting brackets, which are rotatably connected to the panel 2 and are provided with male bayonet-coupling means 10 which engage female bayonet-coupling means 11 defined in circular seats 13, which are defined in the covering element 6 and are structured so as to rotatably accommodate the brackets 3. More precisely, as clearly shown in FIG. 3, a threaded member 60 connected to the panel 2 is attached to the bracket 3 by a nut 62 that sits in a recess 61 of the bracket 3.

More particularly, by rotating the brackets 3 through 90° with respect to the normal position of use, it is possible to disengage the male bayonet-coupling means 10 from the female bayonet-coupling means 11, thereby allowing removal of the covering element 6 from the panel 2.

Once the covering 6 has been inserted and the brackets have been rotated, it is not possible to remove the panel, since rotation of the brackets 3 is prevented either by the presence of the skis, which do not allow their rotation, or by wings 15 which are defined by the edges of the transverse bar 4 and do not allow the brackets to rotate freely so that, if the transverse bar 4 is closed with the lockoperated means, it is not possible to remove the covering 6 and consequently remove the magnetic panel 2.

To the above one should also add that sealing gaskets, designated by the reference numeral 16, are advantageously provided and act between the base part 17 of the brackets 3 and the seat 13, preventing inward infiltrations of liquid.

A peripheral seal member or perimetric gasket 18 is furthermore provided perimetrically on the covering element 6, surrounds the panel 2 and in practice prevents the occurrence of water infiltration below the magnetic panel, consequently producing an assembly whose adhesion to the vehicle is ensured in all conditions.

Thus, essentially, the solution consists in providing a covering element which cannot be removed without acting on the lock-operated means, so that the possibility of access to the panel 2 is absolutely prevented, since it is impossible to remove the covering element without acting on the lock-operated means. This fact thus constitutes an extremely valid and safe anti-theft means.

The same solution can have structurally different embodiments.

Thus, for example, FIGS. 7 to 9 show a ski rack, generally designated by the reference numeral 1a, in which there is a magnetic panel, again designated by 2a, on which there are supporting brackets 3a which are supported so that they are fixed with respect to the panel.

There is also a central protrusion, connected to the panel 2a and designated by the reference numeral 20, on which an external protrusion 21 is superimposed; said protrusion 21 is defined monolithically with the covering element 6a.

The external protrusion 21 of the covering element 6a is fixed to the central protrusion 20 of the panel 2a by means of a threaded pin 22 which is actuated by a butterfly lever 23 or similar means which allow to lock the external protrusion 21 of the covering element 6a to the central protrusion 20 of the panel 2a.

The butterfly lever is accommodated below the transverse bar 4a, so that it cannot be accessed except by opening the transverse bar.

In this embodiment, the covering element is fixed to the panel not by the supporting brackets, as in the preceding embodiment, but by the threaded pin 22, which however cannot be actuated if the transverse bar 4a is not opened.

In the embodiment illustrated in FIGS. 10 to 12, generally designated by the reference numeral 1b, there is a magnetic panel, designated by 2b, to which the ski supporting brackets 3b are fixed. A central wing 30 is arranged between the brackets 3b, and a box-like covering element 31 is superimposed on said wing and simultaneously defines both the transverse bar and the covering element.

In practice, the box-like element 31, as more clearly shown in FIG. 11, is provided with through slots 33 for the passage of the ski and is centrally provided with a seat 35 in which lock-operated means 8b are inserted; said lock-operated means act directly on the central wing, securing the box-like element which entirely covers the panel and defines the transverse bracket, which is connected to lock-operated means and prevents the unlawful removal of the skis.

In the fourth embodiment, illustrated in FIGS. 13 to 15 and designated by the reference numeral 1c, there is a magnetic panel 2c to which ski supporting brackets 3c are fixed; the respective outer arm of said brackets is designated by the reference numerals 40 and 41, is elongated and acts as supporting element for a locking cross-member 42 which is pivoted to the arm 40 and can be connected to the elongated arm 41 by virtue of lock-operated means 8c.

There is also a covering element which is constituted by a plate 50 which surmounts and surrounds the panel 2c and defines openings 51 from which the brackets 3c protrude.

In this embodiment, the plate 50, which constitutes the covering element, is retained in position by the skis inserted in the brackets 3c, consequently preventing the removal of the covering element when the skis are inserted, so that the anti-theft function is provided, since it is not possible to access the panel 2c to separate it.

From what has been described above it can thus be seen that the invention achieves the intended aim and objects, and in particular the fact is stressed that a magnetically-coupling ski rack is provided wherein the anti-theft means are obtained by providing a covering element which prevents the separation of the panel of magnetic material by completely surrounding it; the covering element can naturally be removed by acting on the lock-operated means, so as to be able to remove the ski rack from the motor vehicle.

In fact, when the covering element is removed, it is possible to access the magnetic panel and gradually separate it from the motor vehicle.

The invention thus conceived is susceptible to numerous modifications and variations, all of which are within the scope of the inventive concept.

All the details may furthermore be replaced with other technically equivalent elements.

In practice, the materials employed, as well as the contingent shapes and dimensions, may be any according to the requirements.

I claim:

1. A magnetically coupling ski rack for motor vehicles comprising;
    a base device including a magnetic panel, said magnetic panel being attachable to a motor vehicle roof;
    ski support means attached to said base device;
    a covering element mounted on said magnetic panel for covering said magnetic panel;
    releasable securing means for fixing and positioning said covering element on said magnetic panel, and;
    lock means for preventing access to said magnetic panel when covered by said covering element.

2. The magnetically coupling ski rack according to claim 1, wherein said ski support means comprise a ski support bracket, said ski support bracket protruding upwardly from said base device and defining said releasable securing means.

3. The magnetically coupling ski rack according to claim 2, wherein said ski support bracket comprises a fixing member having a male bayonet-coupling means, and wherein said covering element has formed therein a female bayonet-coupling means, said male bayonet-coupling means being releasably connectable to said female bayonet-coupling means for releasably connecting said ski support bracket to said covering element.

4. The magnetically coupling ski rack according to claim 1, further comprising a peripheral seal member connected to said covering element for preventing water infiltration between said magnetic panel and a motor vehicle roof.

5. In a magnetically coupling rack for motor vehicles having a magnetic panel attachable to a motor vehicle roof and an article supporting device connected thereto;

a covering element covering said magnetic panel for preventing access thereto;

connection means for connecting said covering element to said magnetic panel, and;

means for locking said connection means for preventing removal of said covering element from said magnetic panel.

6. The magnetically coupling rack of claim 5, wherein said magnetic panel is made of magnetic rubber.

7. The magnetically coupling rack of claim 5, wherein said article supporting device is rotatably connected to said magnetic panel.

8. The magnetically coupling rack of claim 5, wherein said connection means for connecting said covering element to said magnetic panel are defined by said article supporting device and said covering element.

9. The magnetically coupling rack of claim 5, wherein said covering element has connected thereto, a perimetric sealing gasket for preventing water infiltration between said magnetic panel and a motor vehicle roof.

10. The magnetically coupling rack of claim 5, wherein said means for locking said connection means comprise a lockable member pivotally connected to said covering element.

11. The magnetically coupling rack of claim 5, wherein the means for locking said connection means comprise a transverse bar having one end pivotally connected to said covering element, another end opposite said one end, lock-operatable means connected to said other end and lockable to said covering element.

12. The magnetically coupling rack of claim 5, wherein said article supporting device comprises at least two ski supporting brackets connected to said magnetic panel.

13. The magnetically coupling rack of claim 12, wherein said at least two ski supporting brackets are rotatably connected to said magnetic panel.

14. The magnetically coupling rack of claim 13, wherein said ski supporting brackets each have a base part, and further comprising sealing gaskets interposed between said base part of each of said at least two ski supporting brackets and said covering element.

* * * * *